Oct. 8, 1957   R. A. DUNCAN ET AL   2,808,865
SUGAR CANE SEGMENTIZING APPARATUS
Filed July 12, 1956   2 Sheets-Sheet 1

INVENTORS
RICHARD ARNOT DUNCAN
DAVID M. BURNS
BY
Lyon & Lyon
ATTORNEYS

Oct. 8, 1957  R. A. DUNCAN ET AL  2,808,865
SUGAR CANE SEGMENTIZING APPARATUS
Filed July 12, 1956  2 Sheets-Sheet 2

INVENTORS
RICHARD ARNOT DUNCAN
DAVID M. BURNS
BY
Lyon & Lyon
ATTORNEYS

United States Patent Office 2,808,865
Patented Oct. 8, 1957

2,808,865

SUGAR CANE SEGMENTIZING APPARATUS

Richard Arnot Duncan, Honolulu, and David M. Burns, Haina, Territory of Hawaii, assignors to Hawaiian Development Company, Ltd., Honolulu, Territory of Hawaii, a limited corporation of Hawaii Application July 12, 1956, Serial No. 597,379

6 Claims. (Cl. 146—119)

This invention relates to sugar cane segmentizing apparatus, and included in the objects of the invention are:

First, to provide a sugar cane segmentizing apparatus adapted to be mounted at the discharge end of the conveyor which elevates the tangled mass of sugar cane as it is cut by a sugar cane harvester.

Second, to provide a sugar cane segmentizing apparatus which utilizes sets of transversely reciprocating blades adapted to move in a path converging toward and in the direction of movement of the mat of sugar cane, so as to enter and completely sever the mat transversely in order to divide the mat into relatively short sections or segments.

Third, to provide an apparatus of this class which effects a clean cut through the mat of sugar cane with a minimum of crushing or other damaging action to the sugar cane.

Fourth, to provide an apparatus of this class wherein two or more cutting units are revolvably mounted at the discharge end of the harvester conveyor and arranged to rotate in the direction of travel of the conveyor, and wherein the conveyor is provided with means at its extremity for elevating the mat of sugar cane, free of the conveyor lugs, and into position for complete severance by the segmentizing apparatus.

With the above and other objects in view, as may appear hereinafter, reference is directed to the accompanying drawings in which.

Figure 1:
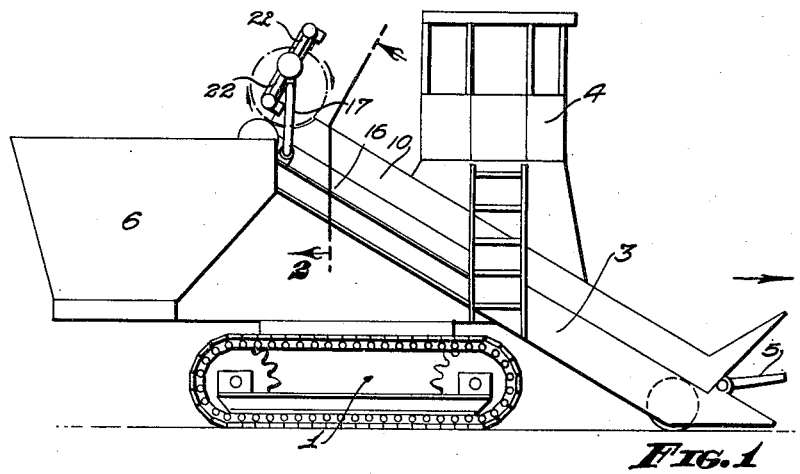
Figure 1 is a substantially diagrammatical side view of a sugar cane harvester incorporating the segmentizing apparatus.
Figure 2:
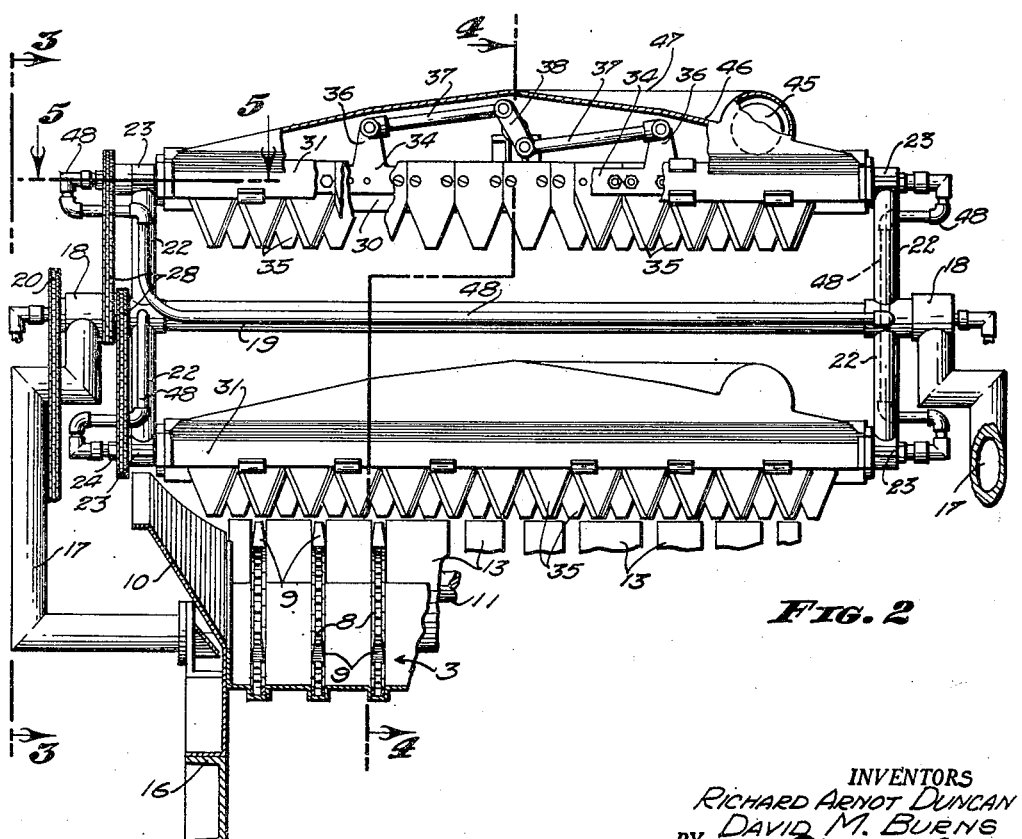
Fig. 2 is an enlarged, fragmentary, transverse, sectional view through 2—2 of Fig. 1 showing the segmentizing apparatus.

The sugar cane segmentizing apparatus is adapted to be used on a sugar cane harvester which, for the purposes of the present invention, may be considered as conventional.

The typical sugar cane harvester is mounted on a suitable crawler type traction unit 1 and includes a body structure 2 pivotally mounted about a vertical axis. The body structure carries a suitable power source, not shown, employed to drive the traction unit 1, and also supports an inclined conveyor 3. One conventional type of sugar cane harvester is provided with a control cab 4 mounted astraddle the inclined conveyor.

The lower end of the conveyor 3 is located contiguous to the ground. At this end there is provided suitable harvesting means 5, partially indicated in Fig. 1. The harvesting means is employed to sever the sugar cane at approximately ground level, and also to cut the sugar cane vertically at the sides of the swath or path along which the harvester moves.

It should be observed that the sugar cane at the time of harvesting is in a tangled mat or mass, with the shoots extending laterally in all directions as well as vertically. The mat of severed sugar cane is raised by the inclined conveyor 3 and disposed in a hopper 6 at the rear end of the machine, for later transfer to trucks or other equipment. Because of the fact that the sugar cane is in the form of a tangled mass or mat, great difficulty is encountered in separating the sugar cane so that it may be transferred from the hopper 6 to a truck or the like.

The segmentizing apparatus is mounted above the discharge end of the conveyor 3, and transverse cutting of the mat of sugar cane is accomplished by the sugar cane segmentizing apparatus, which constitutes the present invention.

The inclined conveyor 3 includes a bed 7 having channels in which ride conveyor chains 8 provided at spaced intervals with lugs 9 for engaging and moving the sugar cane. Walls 10 are provided along the sloping sides of the conveyor.

The upper end of the conveyor 3 is provided with a transverse shaft 11 on which are mounted sprockets 12 for the conveyor. Between the sprockets and rotatable with the shaft 11 is a series of drums 13 having sufficient diameter as to project above the lugs 9 as they pass around the conveyor sprockets 12, as shown best in Fig. 4. Externally of one of the side walls 10 the shaft 11 is provided with a suitable drive sprocket 14 operated by a drive chain 15 suitably connected with the power source, not shown.

The sides of the bed 7 rest on side frame members 16. Supported from these members, near the upper end of the conveyor 3, is a pair of brackets 17 which project upwardly to a point in a plane normal to the longitudinal axis of the inclined conveyor 3, as shown in Fig. 1.

The supporting brackets 17 are provided with bearings 18 which journal therebetween an axle 19. A sprocket 20 is provided at one extremity of the axle and is rotated by a suitable drive chain 21 appropriately connected to the power supply carried by the body structure 2.

Each end of the axle 19 is provided with radiating arms 22. In the construction illustrated, a pair of such arms are provided. The arms 22 terminate in bearings 23 disposed in transversely aligned pairs.

The bearings 23 receive stub shafts 24 which protrude from mounting plates 25. Cross beams 26 connect pairs of the mounting plates so as to rotate about the axes defined by the corresponding pairs of stub shafts 24. The stub shafts 24 carry sprockets 27 and the axle 19 is provided with sprockets 28.

The sprockets 27 and 28 are joined by chains 29. The sprockets 27 and 28 are of equal size so that as the assemblies comprising the stub shafts 24, mounting plates 25, and cross beams 26 rotate about the axis of the axle 19 they remain oriented in the same direction.

Supported between the mounting plates 25, forwardly of the axes defined by the stub shafts 24, that is, in a direction toward the lower or receiving end of the inclined conveyor 3, are complementary housings 30 and 31. Each housing 30 is permanently secured between its pair of mounting plates 25, whereas the housing 31 is removably connected thereto by end flanges 32 and joined to the housing 31 by connecting straps 33 extending across the upper margins of the housings.

The complementary housings 30 and 31 are substantially channel-shaped with their recessed sides facing each other so as to form a tubular structure. The housings are spaced from each other so as to define therebetween longitudinal slits extending between the mounting plates 25. Slidably mounted within the housings 30 and 31 are cutter slide bars 34. There being a pair of such slide bars in each housing.

Secured to the confronting sides of the cutter slide bars 34 are a series of cutter teeth 35. Each cutter tooth is substantially triangular in form with its apex pointing downward. The sides converging towards the apex are sharpened. The confronting sides of the two sets of cutter teeth 35 thus provided bear against each other so that as the cutter teeth are moved back and forth, that is, laterally with respect to the inclined conveyor 3, they sever material caught between the teeth.

Each cutter slide bar 34 is provided with an upstanding arm 36, preferably located off center. The arms of each corresponding pair of cutter slide bars are joined by connecting rods 37 to a crankshaft 38 having two throws, so that as the crankshaft is rotated the cutter slide bars 34 are moved back and forth so as to cause the cutter teeth 35 to slide back and forth.

The crankshaft 38 is supported on suitable bearings 39 and 40, supported from brackets 41 and 42 secured to the cross beams 26. A sprocket 43 is mounted between the bearings 39 and 40 and is connected by a chain 44 to a motor 45 suitably supported from the cross beams 26. The motor 45, crankshaft 38, and connecting rods 37 are covered by a suitable enclosure 46, and a chain guard 47 is provided around the chain 44.

The motor 45 may be an electric or hydraulic motor. If a hydraulic motor is employed, hydraulic pressure fluid is supplied through suitable pipe lines 48 carried by the frame structure, comprising the axle 19, arms 22, and cross beams 26. The supply lines pass through suitable journal connections, not shown, located within the bearings 18 and lead therefrom to a source of hydraulic pressure fluid. If electric motors are employed, conventional slip ring connections are provided within the bearings 18 so that electrical power may be supplied to the motors from a source external of the segmentizing apparatus.

Figure 3:
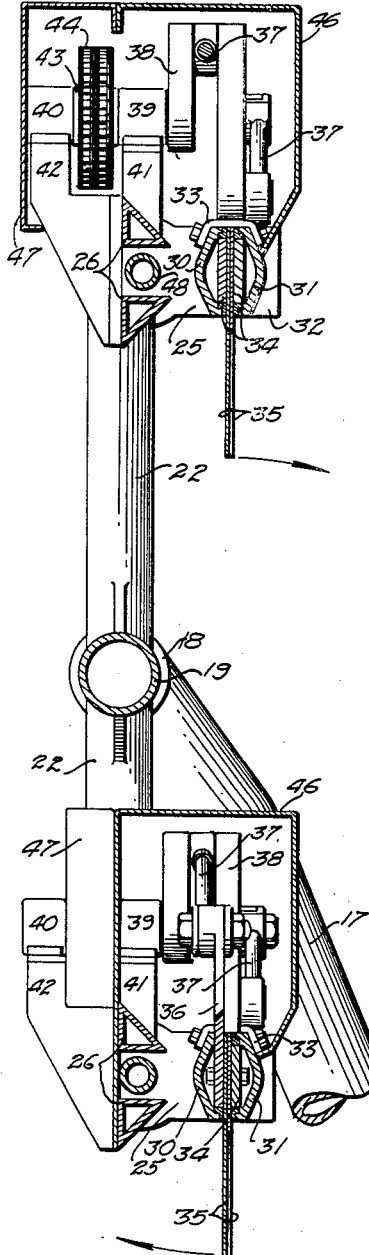
Fig. 3 is a side view of the segmentizing apparatus, taken from the line 3—3 of Fig. 2, showing adjacent portions of the conveyor, the view tilted to bring the conveyor into a horizontal position to facilitate the illustration.
Figure 3:
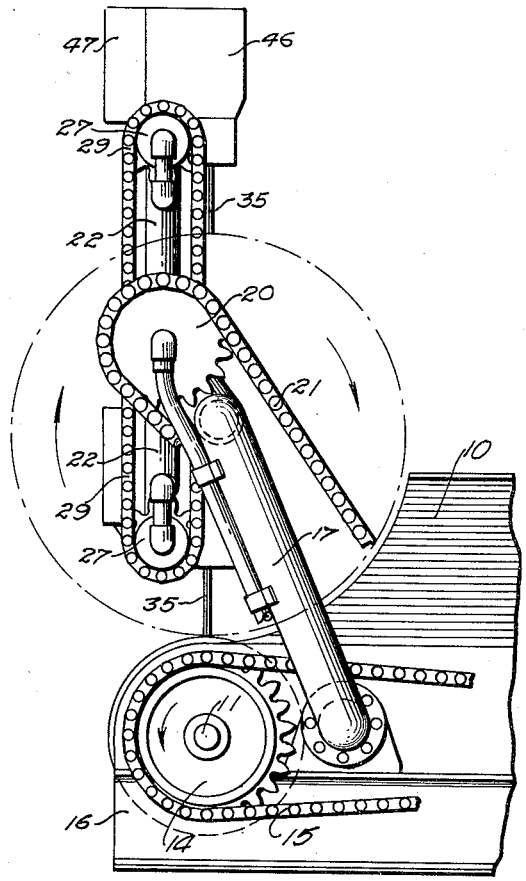
Figure 5:
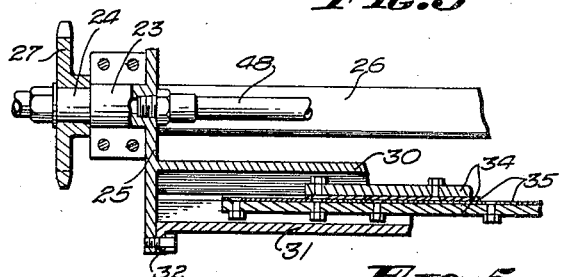
Fig. 5 is a fragmentary sectional view through 5—5 of Fig. 2.
Figure 4:
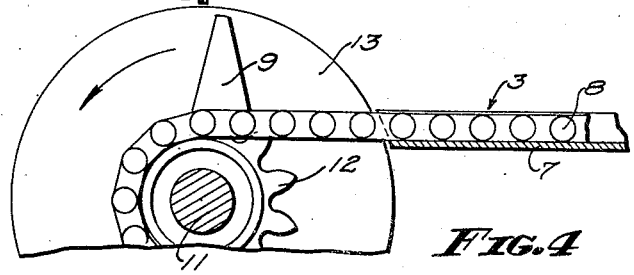
Fig. 4 is a further enlarged, transverse, sectional view through 4—4 of Fig. 2, also with the conveyor tilted to a horizontal position, showing the segmentizing apparatus in an upright or vertical position to facilitate the illustration.

Operation of the segmentizing apparatus is as follows:

In the construction shown, two segmentizing units are shown. These rotate about the axis of the axle 19 in a clockwise direction, as viewed in Fig. 1. The segmentizing units, which include each set of cutter teeth 35, remain oriented in a fixed direction due to the sprockets 27 and 28 and their connecting chains 29. The path of movement of each set of cutter teeth 35 is such that they swing downwardly and rearwardly with respect to the inclined conveyor 3 into and past a position normal to a line tangent to the discharge drums 13, as shown in Figs. 1, 3, and 4.

The cutter teeth 35 are continuously moving back and forth relative to each other, so that as they move toward the discharge drums 13 they penetrate the mass of sugar cane passing thereover and completely sever the mass transversely.

It is desirable that each passage of the segmentizing units make a single clean cut across the moving mass of sugar cane to avoid "recutting" or severing of the cane into unduly short lengths. Also, it is desirable that the crushing of the severed ends be minimized.

By reason of the fact that the segmentizing blades remain oriented in planes substantially perpendicular to the mass of sugar cane, a particularly clean cut is obtained.

Ideally, the rate of rotation of the segmentizing units and the rate of travel of the inclined conveyor 3 should be so coordinated that the cutter teeth move up the conveyor at the same rate as the mass of sugar cane so that the severing of the cane takes place in substantially a single plane. However, due probably to the fact that cutting takes place at the discharge end of the conveyor, so that the severed portion of sugar cane tends to fall away, the relative speeds are not critical. This is indicated by the fact that successful severing of the sugar cane has been accomplished with the segmentizing units traveling at a faster speed than the conveyor.

The number of segmentizing units and the rate of travel are determined by the desired length of each transverse segment of the sugar cane mass, so that the sugar cane mass is cut into segments of a length which may be conveniently handled in the hopper 6 and in the trucks which transport the cane to the refinery.

It will be observed that the sugar cane mat is lifted from engagement with the lugs 9 of the conveyor chains 8 simultaneously with the action of the segmentizing units, so that a complete severance of the mat or blanket of sugar cane may be accomplished without difficulty.

While a particular embodiment of this invention has been shown and described, it is not intended to limit the same to the exact details of the construction set forth, and it embraces such changes, modifications, and equivalents of the parts and their formation and arrangement as come within the purview of the appended claims.

We claim:

1. In a sugar cane harvester having an inclined conveyor adapted to elevate a tangled mat of sugar cane, the combination of a sugar cane segmentizing apparatus, comprising: supporting means defining an axis of rotation above and parallel to the discharge end of said conveyor; a frame structure rotatably supported by said means; cutter housings at the radial extremities of said frame structure disposed transversely of the discharge end of said conveyor; reciprocable sets of cutter blades mounted in said housings and having cutting edges projecting therefrom; means carried by said frame structure for reciprocating said cutter blades; and means for rotating said frame structure at a predetermined speed with respect to the travel speed of said conveyor to cause said cutter blades to describe paths approaching tangency to the discharge end of said conveyor, thereby to sever periodically the mat of sugar cane transversely.

2. In a sugar cane harvester having an inclined conveyor adapted to elevate a tangled mat of sugar cane, the combination of a sugar cane segmentizing apparatus, comprising: supporting means defining an axis of rotation above and parallel to the discharge end of said conveyor; a frame structure rotatably supported by said means; cutter housings journaled at the radial extremities of said frame structure about an axis parallel to the axis of rotation of said frame structure; means for rotating said frame structure; means for rotating said cutter housings in such relation to rotation of said frame structure that said cutter housings remain oriented in a predetermined direction; cutter blades carried by said cutter housings and maintained in a depending position relative thereto, said cutter blades, on rotation of said frame structure, caused to describe paths approaching tangency to the discharge end of said conveyor while moving in the direction of travel of said mat of sugar cane, thereby to sever the mat transversely.

3. A sugar cane segmentizing apparatus, comprising: an inclined conveyor adapted to feed upwardly a mat of harvested sugar cane, said conveyor including a drive shaft at its upper discharge ends, sprockets on said drive shaft, elevating drums between said sprockets, conveyor chains adapted to pass around said sprockets, and conveying lugs on said chains adapted to pass between said drums, said drums being at least equal to the radius of said lugs whereby the mat of sugar cane is raised from said lugs as the mat passes over said drums for discharge from said conveyor; supporting means defining an axis of rotation above and parallel to the discharge end of said conveyor; a frame structure rotatably supported by said means for movement about said axis, whereby said frame structure moves in a circle approximately tangent to the discharge end of said conveyor; means for rotating said frame structure so that as it approaches tangency with the discharge end of the conveyor it is moving in the direction of travel of the sugar cane mat carried thereby; and cutter means carried by said frame structure and disposed transversely of the discharge end of the conveyor to sever the mat of sugar cane with each rotation of said frame structure.

4. A sugar cane segmentizing apparatus, comprising: an inclined conveyor adapted to feed upwardly a mat of harvested sugar cane, said conveyor including a drive shaft at its upper discharge ends, sprockets on said drive shaft, elevating drums between said sprockets, conveyor chains adapted to pass around said sprockets, and conveying lugs on said chains adapted to pass between said drums, said drums being of greater radius than said lugs whereby the mat of sugar cane is raised from said lugs as the mat passes over said drums for discharge from said conveyor; supporting means defining an axis of rotation above and parallel to the discharge end of said conveyor; a frame structure rotatably supported by said means; cutter housings at the radial extremities of said frame structure disposed transversely of the discharge end of said conveyor; reciprocable sets of cutter blades mounted in said housings and having cutting edges projecting therefrom; means carried by said frame structure for reciprocating said cutter blades; and means for rotating said frame structure in unison with said conveyor to cause said cutter blades to describe paths approaching tangency to the discharge end of said conveyor, thereby to sever periodically the mat of sugar cane transversely.

5. A sugar cane segmentizing apparatus, comprising: an inclined conveyor adapted to feed upwardly a mat of harvested sugar cane, said conveyor including a drive shaft at its upper discharge ends, sprockets on said drive shaft, elevating drums between said sprockets, conveyor chains adapted to pass around said sprockets, and conveying lugs on said chains adapted to pass between said drums, said drums being of greater radius than said lugs whereby the mat of sugar cane is raised from said lugs as the mat passes over said drums for discharge from said conveyor; supporting means defining an axis of rotation above and parallel to the discharge end of said conveyor; a frame structure rotatably supported by said means; cutter housings journaled at the radial extremities of said frame structure about an axis parallel to the axis of rotation of said frame structure; means for rotating said frame structure; means for rotating said cutter housings in such relation to rotation of said frame structure that said cutter housings remain oriented in a predetermined direction; cutter blades carried by said cutter housings and maintained in a depending position relative thereto, said cutter blades, on rotation of said frame structure, caused to describe paths approaching tangency to the discharge end of said conveyor while moving in the direction of travel of said mat of sugar cane thereby to sever the mat transversely.

6. In a sugar cane harvester having an inclined conveyor adapted to elevate a tangled mat of sugar cane, the combination of a sugar cane segmentizing apparatus, comprising: brackets extending upwardly from the sides of said conveyor; a shaft journaled at the ends of said brackets about an axis parallel with the discharge end of said conveyor; at least one pair of radiating arms at the extremities of said shaft adjacent said brackets; a supporting structure journaled between the extremities of said arms about an axis parallel to said shaft; a pair of complementary housing members carried by said supporting structure and extending between said arms in parallelism with said axes; a pair of cutter blade bars mounted in said housings; means carried by said supporting structure for reciprocating said cutter bars in opposition to each other; a plurality of cutter teeth depending from said bars; and means interconnecting said shaft and supporting structure to cause said supporting structure to turn on its axis as it rotates about the axis of said shaft so as to maintain said cutter teeth oriented in a depending position; said cutter teeth adapted on rotation of said supporting structure to describe a path approaching tangency to the discharge end of said conveyor, the direction of movement corresponding to the direction of movement of said mat of sugar cane, whereby said cutter teeth enter and sever said mat transversely.

References Cited in the file of this patent

UNITED STATES PATENTS

| 1,221,594 | Richman | Apr. 3, 1917 |
| 1,903,335 | Falkiner | Apr. 4, 1933 |
| 2,187,252 | Urschel | Jan. 16, 1940 |
| 2,716,318 | Skromme | Aug. 30, 1955 |

FOREIGN PATENTS

| 15,204 | Netherlands | Sept. 15, 1926 |